(12) United States Patent
He et al.

(10) Patent No.: US 12,517,055 B2
(45) Date of Patent: Jan. 6, 2026

(54) DEFECT DETECTION METHOD, APPARATUS AND DEVICE, AND COMPUTER-READABLE STORAGE MEDIUM

(71) Applicant: JI HUA LABORATORY, Guangdong (CN)

(72) Inventors: Zhaoming He, Foshan (CN); Hai Bi, Foshan (CN); Jiangwei Duan, Foshan (CN); Wei Wang, Foshan (CN); Wanli Yang, Foshan (CN)

(73) Assignee: JI HUA LABORATORY, Guangdong (CN)

( * ) Notice: Subject to any disclaimer, the term of this patent is extended or adjusted under 35 U.S.C. 154(b) by 191 days.

(21) Appl. No.: 18/577,859

(22) PCT Filed: Sep. 30, 2022

(86) PCT No.: PCT/CN2022/122989
§ 371 (c)(1),
(2) Date: Jan. 9, 2024

(87) PCT Pub. No.: WO2023/159961
PCT Pub. Date: Aug. 31, 2023

(65) Prior Publication Data
US 2024/0319099 A1 Sep. 26, 2024

(30) Foreign Application Priority Data

Feb. 25, 2022 (CN) .......................... 202210174486.5

(51) Int. Cl.
*G01N 21/88* (2006.01)
*G01N 21/63* (2006.01)
(Continued)

(52) U.S. Cl.
CPC ......... *G01N 21/6489* (2013.01); *G01N 21/63* (2013.01); *G01N 21/6456* (2013.01);
(Continued)

(58) Field of Classification Search
CPC .............. G01N 21/63; G01N 21/6456; G01N 21/6489; G01N 21/8851; G01N 21/9505;
(Continued)

(56) References Cited

U.S. PATENT DOCUMENTS

| | | |
|---|---|---|
| 2020/0160083 A1 | 5/2020 | Zhu et al. |
| 2020/0279835 A1 | 9/2020 | Sasaki et al. |
| 2022/0108436 A1* | 4/2022 | Kang .................. G06T 7/97 |
| 2022/0292299 A1* | 9/2022 | Nakata ............. G06F 18/2133 |

FOREIGN PATENT DOCUMENTS

| | | |
|---|---|---|
| CN | 108765389 A | 11/2018 |
| CN | 111340783 A | 6/2020 |

(Continued)

OTHER PUBLICATIONS

Binhui et al., "Research on Defect Detection Technology of Photovoltaic Cells Based on GoogLeNet and EL", Electronic Product Reliability and Environmental Testing, vol. 37, Jun. 2019, 6 pages.
(Continued)

*Primary Examiner* — Mark R Gaworecki
(74) *Attorney, Agent, or Firm* — Dority & Manning, PA

(57) ABSTRACT

A defect detection method includes: acquiring a photoluminescence detection result of a wafer to be detected; generating a defect heat map corresponding to said wafer according to the photoluminescence detection result and a preset heat map model, the preset heat map model being constructed on the basis of a photoluminescence detection result sample after electroluminescent defect marking; and determining a defect detection result of said wafer according to the defect heat map.

14 Claims, 4 Drawing Sheets

(51) Int. Cl.
  *G01N 21/64* (2006.01)
  *G01N 21/95* (2006.01)
  *G01N 25/72* (2006.01)
  *G06T 7/00* (2017.01)
  *H01L 21/66* (2006.01)
  *H01L 21/67* (2006.01)

(52) U.S. Cl.
  CPC ..... *G01N 21/8851* (2013.01); *G01N 21/9505* (2013.01); *G01N 25/72* (2013.01); *G06T 7/0004* (2013.01); *H01L 21/67288* (2013.01); *H01L 22/12* (2013.01); *H01L 22/20* (2013.01); *G01N 2021/8864* (2013.01); *G01N 2021/8887* (2013.01); *G01N 2201/1296* (2013.01); *G06T 2207/20021* (2013.01); *G06T 2207/30148* (2013.01); *Y02P 90/30* (2015.11)

(58) Field of Classification Search
  CPC ... G01N 2021/8864; G01N 2021/8887; G01N 2201/1296; G06T 7/0004; G06T 2207/20021; G06T 2207/30148; H01L 22/12; H01L 22/20; Y02P 90/30
  See application file for complete search history.

(56) References Cited

FOREIGN PATENT DOCUMENTS

| | | |
|---|---|---|
| CN | 111369550 A | 7/2020 |
| CN | 111640089 A | 9/2020 |
| CN | 111929310 A | 11/2020 |
| CN | 112070733 A | 12/2020 |
| CN | 112132196 A | 12/2020 |
| CN | 112288676 A | 1/2021 |
| CN | 112394270 A | 2/2021 |
| CN | 113344886 A | 9/2021 |
| CN | 113781391 A | 12/2021 |
| CN | 113822870 A | 12/2021 |
| CN | 114235759 A | 3/2022 |
| EP | 3789759 A1 | 3/2021 |
| WO | WO 2020058219 A1 | 3/2020 |

OTHER PUBLICATIONS

Office Action (with English translation) received in corresponding Application No. 202210174486.5, dated Apr. 1, 2022, 25 pages.
International Search Report and Written Opinion (with English translation) received in Application No. PCT/CN2022/122989, dated Dec. 16, 2022, 17 pages.

* cited by examiner

DEFECT DETECTION METHOD, APPARATUS AND DEVICE, AND COMPUTER-READABLE STORAGE MEDIUM

CROSS-REFERENCE TO RELATED APPLICATIONS

The present application is a US national phase under 35 U.S.C. § 371 of PCT international application No. PCT/CN2022/122989, which has an international filing date of Sep. 30, 2022 and claims priority to Chinese patent application No. 202210174486.5, titled "DEFECT DETECTION METHOD, APPARATUS AND DEVICE, AND COMPUTER-READABLE STORAGE MEDIUM", filed with the China National Intellectual Property Administration on Feb. 25, 2022. The entire-contents of the above identified PCT international application and Chinese patent application are incorporated herein in their entireties by reference for all purposes.

TECHNICAL FIELD

The present disclosure relates to the technical field of wafer defect detection, and in particular, to a defect detection method, apparatus and device, and a computer-readable storage medium.

BACKGROUND

Wafer defect detection is usually performed using a variety of different technical means, such as photoluminescence detection and electroluminescence detection. During a photoluminescence detection process, different imaging methods may obtain different results. The general analysis method is to analyze the detection results of the microscopic field of view one by one or the detection results of the pixels one by one, which is easy to ignore the connection between the imaging results and cause misjudgment of defects. The cost of the electroluminescence detection is relatively high, and it is easy to affect the wafer. Moreover, correspondence between the photoluminescence detection result and the electroluminescence detection has not been introduced, and the case of electroluminescence cannot be completely determined using the photoluminescence result alone.

The above content is only used to assist in understanding the technical solution of the present disclosure, and does not represent an admission that the above content is prior art.

SUMMARY

The main objective of the present disclosure is to provide a defect detection method, apparatus and device, and a computer-readable storage medium, aiming to solve the technical problems in the related technology that detection accuracy of the photoluminescence detection is relatively low, the electroluminescence detection may scratch the panel, and detection speed is relatively slow.

In order to achieve the above objective, the present disclosure provides a defect detection method, including:
acquiring a photoluminescence detection result of a wafer to be detected;
generating, based on the photoluminescence detection result and a preset heat map model, a defect heat map corresponding to the wafer to be detected, the preset heat map model being constructed based on a photoluminescence detection result sample marked by an electroluminescence defect; and
determining, based on the defect heat map, a defect detection result of the wafer to be detected.

In some embodiments, before the generating, based on the photoluminescence detection result and the preset heat map model, the defect heat map corresponding to the wafer to be detected, the method further includes:
acquiring a photoluminescence detection result sample and an electroluminescence detection result sample of a wafer sample;
performing, based on the electroluminescence detection result sample, electroluminescence defect marking on the photoluminescence detection result sample; and
training, based on the marked photoluminescence detection result sample, an initial neural network model, to obtain the preset heat map model.

In some embodiments, before the performing, based on the electroluminescence detection result sample, the electroluminescence defect marking on the photoluminescence detection result sample, the method further includes:
processing, based on a preset segmentation size, the photoluminescence detection result sample, to obtain photoluminescence detection sub-images of the preset segmentation size.

The performing, based on the electroluminescence detection result sample, the electroluminescence defect marking on the photoluminescence detection result sample, includes:
performing, based on the electroluminescence detection result sample, the electroluminescence defect marking on the photoluminescence detection sub-images.

In some embodiments, the generating, based on the photoluminescence detection result and the preset heat map model, the defect heat map corresponding to the wafer to be detected, includes:
performing an electroluminescence defect prediction on the photoluminescence detection result with the preset heat map model, to obtain prediction process information;
acquiring a fusion coefficient and output information of each channel in the prediction process information; and
generating, based on the fusion coefficient and the output information, the defect heat map corresponding to the wafer to be detected.

In some embodiments, the generating, based on the fusion coefficient and the output information, the defect heat map corresponding to the wafer to be detected, includes:
determining, based on the fusion coefficient and the output information, the defect heat map corresponding to the wafer to be detected through the following formula:

$$\text{image} = \sum_{n=1}^{N} w_n \cdot X_n,$$

where image denotes the defect heat map, N denotes a number of output channels corresponding to a last convolutional layer of the preset heat map model, n denotes the $n^{th}$ channel, $w_n$ denotes a fusion coefficient of the $n^{th}$ channel which is obtained by training an initial neural network, and $X_n$ denotes the output information of the $n^{th}$ channel of the last convolutional layer of the preset heat map model.

In some embodiments, the determining, based on the defect heat map, the defect detection result of the wafer to be detected, includes:

acquiring a resolution of the defect heat map;

smoothing, when the resolution is greater than a preset resolution, the defect heat map; and determining, based on the smoothed defect heat map, the defect detection result.

In some embodiments, after the acquiring the resolution of the defect heat map, the method further includes:

determining, based on a preset defect determination threshold, a defective part in the defect heat map when the resolution is less than or equal to the preset resolution; and determining, based on the defective part, the defect detection result.

In some embodiments, the initial neural network includes a plurality of convolutional layers, a GAP layer, and a fully connected output layer.

In some embodiments, the preset heat map model includes the plurality of convolutional layers, and the fully connected output layer.

In some embodiments, the fusion coefficient of each channel includes a weight coefficient in a first connection parameter set that connects a defective electroluminescence in the fully connected output layer, and a weight coefficient in a second connection parameter set that connects a normal electroluminescence in the fully connected output layer.

In some embodiments, the defect heat map is a wafer image showing a LED with a high probability of containing an electroluminescent defect location in a specially highlighted form.

In some embodiments, the determining, based on the smoothed defect heat map, the defect detection result, includes:

calculating, based on the smoothed defect heat map, an area of a defect area using a method of integrating an area within an envelope.

In addition, the present disclosure further provides a defect detection apparatus. The apparatus includes an acquisition device, a defect heat map generating device, and a detection result determination device.

The acquisition device is configured to acquire a photoluminescence detection result of a wafer to be detected.

The defect heat map generating device is configured to generate, based on the photoluminescence detection result and a preset heat map model, a defect heat map corresponding to the wafer to be detected. The preset heat map model is constructed based on a photoluminescence detection result sample marked by an electroluminescence defect.

The detection result determination device is configured to determine, based on the defect heat map, a defect detection result of the wafer to be detected.

In addition, the present disclosure further provides a defect detection device including a processor and a memory storing a defect detection program executable by the processor. The defect detection program, when executed by the processor, causes the processor to implement steps of the defect detection method described above.

In addition, the present disclosure further provides a computer-readable storage medium storing a defect detection program. The defect detection program, when executed by a processor, causes the processor to implement steps of the defect detection method described above.

In the present disclosure, the photoluminescence detection result of the wafer to be detected is acquired, and then the defect heat map corresponding to the wafer to be detected is generated based on the photoluminescence detection result and the preset heat map model which is constructed based on the photoluminescence detection result sample marked by an electroluminescence defect. Further, the defect detection result of the wafer to be detected is determined based on the defect heat map. With the present disclosure, since the defect heat map corresponding to the wafer to be detected is generated based on the photoluminescence detection result and the preset heat map model, and the defect detection result of the wafer to be detected is determined based on the defect heat map, compared with the traditional method of determining the defect detection result of the wafer based on the photoluminescence detection result and the electroluminescence detection result of the wafer, the present disclosure can improve the detection efficiency and detection accuracy of the wafer.

DETAILED DESCRIPTION OF THE EMBODIMENTS

In order to clearly understand the objectives, functional features and advantages of the present disclosure, the present disclosure will be further described with reference to the accompanying drawings for embodiments of the present application. It should be understood that the specific embodiments described herein are for the purpose of explaining the present disclosure only, and are not intended to limit the present disclosure.

Figure 1:
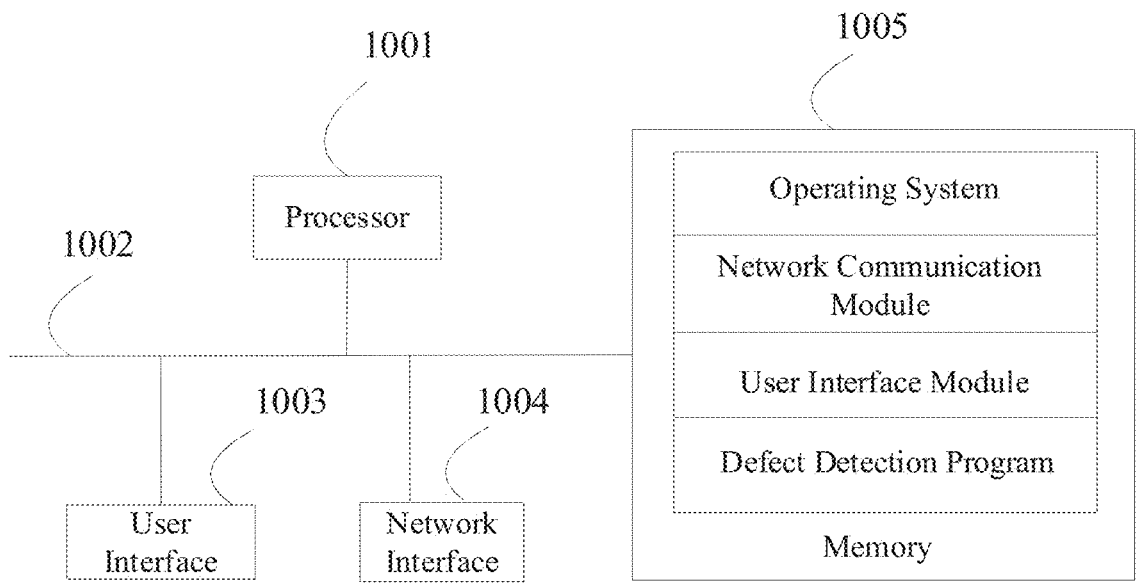
FIG. 1 is a schematic diagram illustrating a hardware operating environment of a defect detection device according to an embodiment of the present disclosure.

Referring to FIG. 1, FIG. 1 is a schematic diagram illustrating a hardware operating environment of a defect detection device according to an embodiment of the present disclosure.

As shown in FIG. 1, the defect detection device may include: a processor 1001 such as a central processing unit (CPU), a communication bus 1002, a user interface 1003, a network interface 1004, and a memory 1005. The communication bus 1002 is used to implement communication connections between these components. The user interface 1003 may include a display screen, and an input unit such as a keyboard. In some embodiments, the user interface 1003 may also include a standard wired interface or a wireless interface. The network interface 1004 may include a standard wired interface or a wireless interface (such as a wireless-fidelity (Wi-Fi) interface). The memory 1005 may include a high-speed random access memory (RAM), or a stable non-volatile memory (NVM), such as a disk memory.

In some embodiments, the memory 1005 may also include a storage device independent of the processor 1001.

A person skilled in the art can understand that the configuration shown in FIG. 1 does not constitute a limitation on the defect detection device, and may include more or less components than shown in the figure, or include a combination of certain components, or have different component arrangements.

As shown in FIG. 1, the memory 1005 as a storage medium may include an operating system, a network communication device, a user interface device, and a defect detection program.

In the defect detection device shown in FIG. 1, the network interface 1004 is mainly used for data communication with a network server. The user interface 1003 is mainly used for data interaction with a user. The processor 1001 and the memory 1005 in the defect detection device of the present disclosure may be arranged in the defect detection device. The defect detection device calls the defect detection program stored in the memory 1005 through the processor 1001, and executes a defect detection method provided by the embodiments of the present disclosure.

Figure 2:
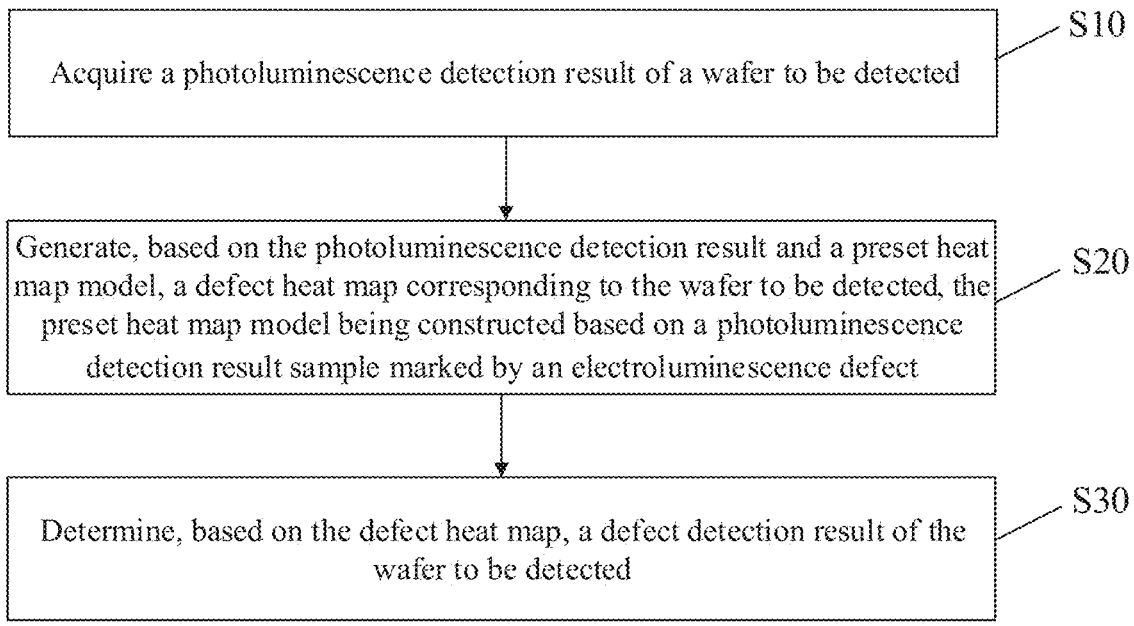
FIG. 2 is a flow diagram illustrating a defect detection method according to a first embodiment of the present disclosure.

Based on the above defect detection device, embodiments of the present disclosure provide a defect detection method. Referring to FIG. 2, FIG. 2 is a flow diagram illustrating a defect detection method according to a first embodiment of the present disclosure.

In this embodiment, the defect detection method includes steps S10 to S30.

In step S10, a photoluminescence detection result of a wafer to be detected is acquired.

It should be noted that the execution subject of this embodiment may be a computing service device with data processing, network communication and program running functions, such as a mobile phone, a tablet computer, a personal computer, an electronic device capable of realizing the above functions, or a wafer defect detection device. Taking the wafer defect detection device as an example, this embodiment and the following embodiments will be described below.

It should be noted that the wafer to be detected may be a silicon wafer used for manufacturing a silicon semiconductor circuit, such as a micro-LED. The photoluminescence detection result may be a detection result obtained by performing a photoluminescence detection on the wafer to be detected. The photoluminescence detection may detect an excitation spectrum of a LED under a field of view of a microscope after being excited by a laser using a confocal technology, or acquire the excitation spectrum at each position on the wafer using other spectral imaging methods. These photoluminescence detection results may generally be stored as pictures.

In step S20, a defect heat map corresponding to the wafer to be detected is generated based on the photoluminescence detection result and a preset heat map model. The preset heat map model is constructed based on a photoluminescence detection result sample marked by an electroluminescence defect.

It should be noted that the defect heat map may be a wafer image showings a LED with a high probability of containing an electroluminescent defect location in a specially highlighted form. The preset heat map model is constructed based on the photoluminescence detection result sample marked by the electroluminescence defect. The preset heat map model may determine a connection between an electroluminescence defect detection result and a photoluminescence defect detection result. When detecting the wafer to be detected, the process of electroluminescence defect detection may be skipped, and the defect heat map corresponding to the wafer to be detected may be directly generated based on the photoluminescence detection result and the preset heat map model, and then the defect detection result of the wafer to be detected may be determined. The defect heat map may be an image generated based on the preset heat map model, and prediction process information predicted by the photoluminescence detection result.

In step S30, a defect detection result of the wafer to be detected is determined based on the defect heat map.

It should be noted that the defect detection result may include information such as whether the wafer to be detected has a defect, a location of the defect, and a size of the defect.

Further, in order to accurately obtain the defect detection result of the wafer to be detected, the step S30 may include: acquiring a resolution of the defect heat map; smoothing, when the resolution is greater than a preset resolution, the defect heat map; and determining, based on the smoothed defect heat map, the defect detection result.

It should be noted that the preset resolution may be a predetermined resolution. When the resolution of the defect heat map is greater than the preset resolution, in order to make the defect detection result more accurate, a filter may be used to smooth the defect heat map before calculating an area of a defect area in the defect detection result. When calculating the area of the defect area, a method of integrating an area within an envelope may be used. In addition, after obtaining the defect heat map, the obtained defect heat map may also be further manually annotated. The annotated defect heat map may be used as an input to train a deep learning model, to make a corresponding prediction.

Further, in order to improve the efficiency of obtaining the defect detection result, after the step of acquiring the resolution of the defect heat map, the method further includes: determining, based on a preset defect determination threshold, a defective part in the defect heat map when the resolution is less than or equal to the preset resolution; and determining, based on the defective part, the defect detection result.

It should be noted that the preset defect determination threshold may be a threshold that can be used to determine that there is a defect in the area. Determining the defective part in the defect heat map based on the preset defect determination threshold may include determining the defective part in the defect heat map based on the preset defect determination threshold and a defect value in the defect heat map. The defect value may be a pixel value of each pixel in the defect heat map. When the defect value is greater than the preset defect determination threshold, the pixel is determined to be a defective pixel, and several consecutive defective pixels may constitute the defective part. Determining the defect detection result based on the defective part may include generating the defect detection result based on a location, a size and other information of the defective part, or may include determining the location and the size of the defective part based on locations and number of the defective pixels corresponding to the defective part, and generating the defect detection result.

In this embodiment, the photoluminescence detection result of the wafer to be detected is acquired, and then the defect heat map corresponding to the wafer to be detected is generated based on the photoluminescence detection result and the preset heat map model which is constructed based on the photoluminescence detection result sample marked by an electroluminescence defect. Further, the defect detection result of the wafer to be detected is determined based on the defect heat map. In this embodiment, since the defect heat map corresponding to the wafer to be detected is generated based on the photoluminescence detection result and the preset heat map model, and the defect detection result of the wafer to be detected is determined based on the defect heat map, compared with the traditional method of determining the defect detection result of the wafer based on the photoluminescence detection result and the electroluminescence detection result of the wafer, the defect detection method of this embodiment can improve the detection efficiency and detection accuracy of the wafer.

Figure 3:
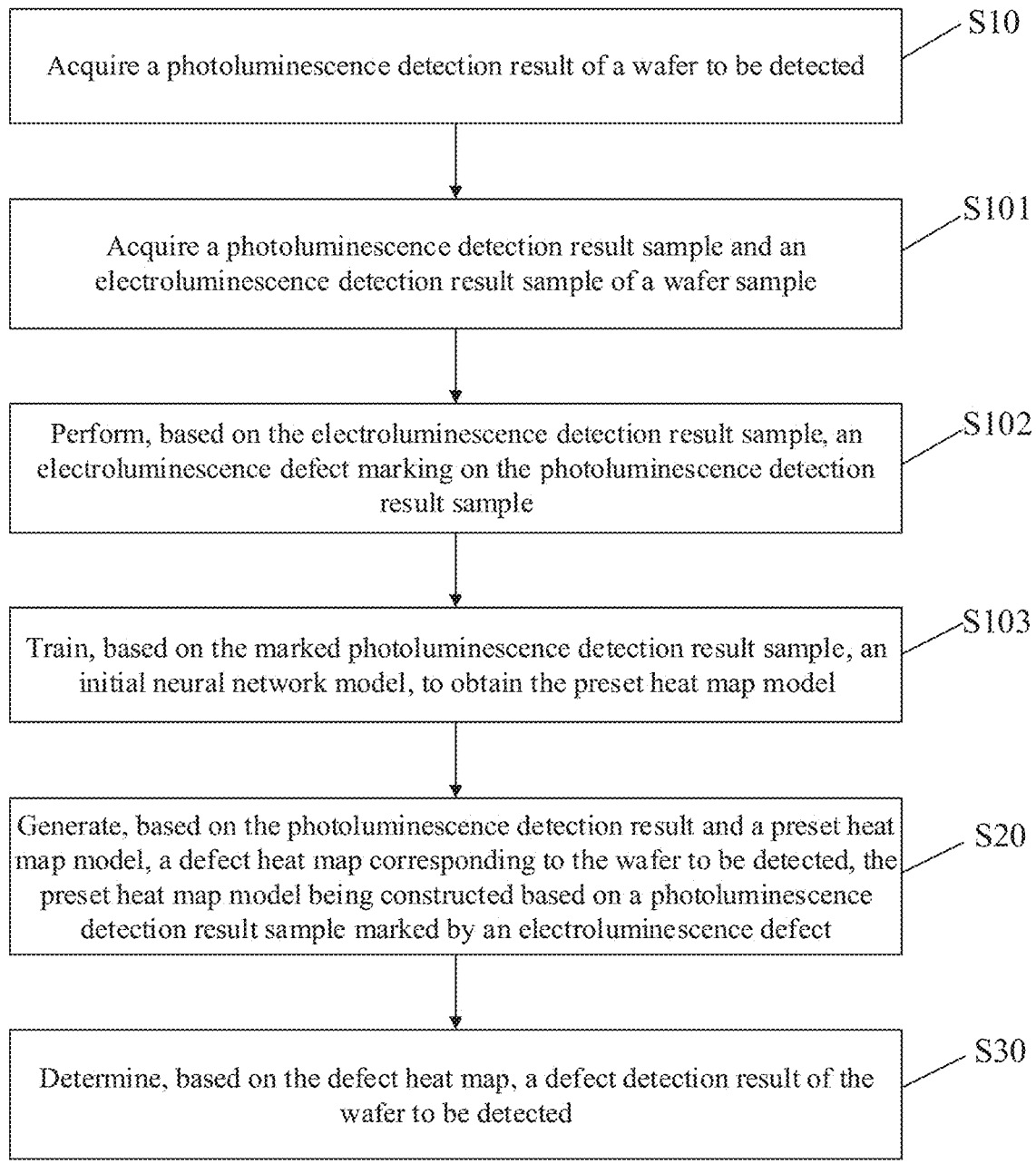
FIG. 3 is a flow diagram illustrating a defect detection method according to a second embodiment of the present disclosure.

Referring to FIG. 3, FIG. 3 is a flow diagram illustrating a defect detection method according to a second embodiment of the present disclosure.

Based on the above-mentioned first embodiment, in this embodiment, before step S20, the method further includes steps S101 to S103.

In step S10l, a photoluminescence detection result sample and an electroluminescence detection result sample of a wafer sample are acquired.

It should be noted that the wafer sample may be a wafer sample required for training an initial neural network model. The photoluminescence detection result sample may be a detection result obtained by performing a photoluminescence detection on the wafer sample. The electroluminescence detection result sample may be a detection result obtained by performing an electroluminescence detection on the wafer sample.

In step S102, an electroluminescence defect marking is performed on the photoluminescence detection result sample based on the electroluminescence detection result sample.

It should be noted that, the performing the electroluminescence defect marking on the photoluminescence detection result sample based on the electroluminescence detection result sample may include marking defect information of the electroluminescence detection result sample in the photoluminescence detection result sample.

Further, in order to improve the accuracy of model prediction, before the step S102, the method further includes: processing, based on a preset segmentation size, the photoluminescence detection result sample, to obtain photoluminescence detection sub-images of the preset segmentation size. Correspondingly, the step of performing, based on the electroluminescence detection result sample, the electroluminescence defect marking on the photoluminescence detection result sample, includes: performing, based on the electroluminescence detection result sample, the electroluminescence defect marking on the photoluminescence detection sub-images.

It should be noted that the preset segmentation size may be a predetermined size, or may be customized based on the size of the photoluminescence detection result. The photoluminescence detection sub-images may be sub-images obtained by segmenting the photoluminescence detection result sample. The performing the electroluminescence defect marking on the photoluminescence detection sub-images based on the electroluminescence detection result sample may include marking the LEDs containing the electroluminescence defect in the photoluminescence detection sub-images based on the electroluminescence detection result sample.

In step S103, an initial neural network model is trained based on the marked photoluminescence detection result sample, to obtain the preset heat map model.

Figure 4:
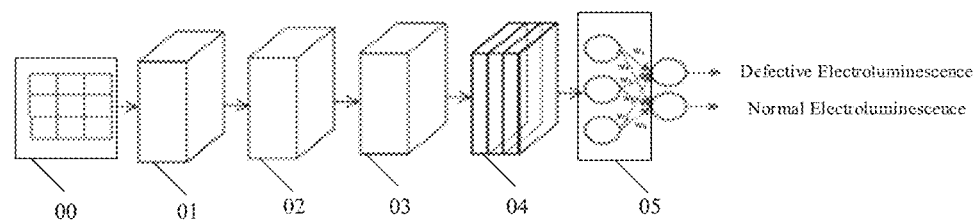
FIG. 4 is a schematic diagram illustrating an initial neural network model training of a defect detection method according to the second embodiment of the present disclosure.

It should be noted that reference may be made to FIG. 4, FIG. 4 is a schematic diagram illustrating an initial neural network model training of a defect detection method according to the second embodiment of the present disclosure. As can be seen from FIG. 4, the initial neural network model is trained based on the marked photoluminescence detection result sample 00. The initial neural network model includes a convolutional layer 01, a convolutional layer 02, a convolutional layer 03, a global average pooling (GAP) layer 04, and a fully connected output layer 05. The marked photoluminescence detection result sample 00 is input into the initial neural network model. The convolutional layer 01, the convolutional layer 02, the convolutional layer 03, the GAP layer 04, and the fully connected output layer 05 of the initial neural network model predict electroluminescence, and obtain an output of the initial neural network model. The output of the initial neural network model may include one or more kinds of electroluminescence defects, and a probability that the electroluminescence is normal.

In a specific implementation, this embodiment mainly uses a global average pooling (GAP) before the output layer of the initial neural network model as a connection between a high-dimensional feature map and the output layer of the initial neural network model. The initial neural network model has two types of output results, i.e., defective electroluminescence and normal electroluminescence. The global average pooling method can convert each channel feature map of a multi-channel feature map input to the GAP layer 04 into a numerical value. For example, in an embodiment, each channel result of a multi-channel result obtained by convolution neural network processing is converted into an average value of each channel. The initial neural network model shown in FIG. 4 includes the GAP layer 04, the convolutional layer 01, the convolutional layer 02, and the convolutional layer 03. The $(k-1)^{th}$ convolutional layer and the $k^{th}$ convolutional layer of the initial neural network model represent the previous convolutional layer and the next convolutional layer, respectively. k denotes the number of convolutional layers. The convolution operation $F_{(k-1)}$ on the $(k-1)^{th}$ convolutional layer converts the input $X_{(k-1)}$ of $N_{(k-1)}$ channels with the height $H_{(k-1)}$ and the width $W_{(k-1)}$ into the output $X_k$ of $N_k$ channels with the height $H_k$ and the width $W_k$. $N_k$ denotes the total number of channels of the $K^{th}$ convolutional layer. The convolution operation $F_{(k-1)}$ may be denoted as follows:

$$X_k = F_{K-1}(X_{k-1}) = \sigma(conv2d(X_{k-1}, \text{Weight}_{k-1}) + \text{bias}_{k-1}).$$

The convolution operation $F_{(k-1)}$ includes a two-dimensional convolution operation $conv2d(\cdot)$ with a convolution kernel of $\text{Weight}_{(k-1)}$, a bias parameter $\text{bias}_{(k-1)}$, and a nonlinear activation function $\sigma(\cdot)$. Generally, the activation function may perform a nonlinear transformation on each element in the matrix using nonlinear functions such as Sigmoid, Relu or tanh. The GAP layer 04 performs a GAP operation on the output result $X_k$ of the $K^{th}$ convolutional layer, to obtain an input of the fully connected output layer 05. The GAP layer 04 performs GAP operations on $N_k$ feature maps, respectively, to obtain an average value of each feature map as an output value of the feature map for the respective channel. Through the GAP operation, the GAP layer 04 finally converts the input single sample data of $N_k$ channels with the height $H_k$ and the width $W_k$ into 1*1*$N_k$ data. The global average pooling method is as follows:

$$\text{out}_n = \frac{1}{H_k \cdot W_k} \sum_{i=1}^{H_k} \sum_{j=1}^{W_k} X_{k_{n,i,j}},$$

where $\text{out}_n$ denotes the $n^{th}$ output element output by the GAP layer 04, n=1, 2, ..., $N_k$. The output of the GAP layer 04 includes $N_k$ output elements, which correspond to the mean values of $N_k$ channels, respectively. $H_k$ and $W_k$ denote the input size of the $n^{th}$ channel, i.e., each channel, of the input $X_k$ of the GAP layer 04. The total number of input elements of each channel is $H_k*W_k$.

In some embodiments of the present disclosure, the initial neural network model may output two types of results of the electroluminescence detection, and the two types of results may be marked with labels. For example, the label [1, 0] indicates that the electroluminescence detection result contains a specified kind of electroluminescence defect, and the label [0,1] indicates that a photoluminescence area input by the initial neural network model does not contain the specified kind of electroluminescence defect. In other words, the electroluminescence is detected to be normal. In some embodiments, the electroluminescence detection result output by the initial neural network model may include a plurality of types, and the plurality of types of detection results may also be marked with labels. For example, the label [1, 1, 1, 1, 0] indicates that the electroluminescence detection result contains four types of electroluminescence defects, the label [0, 0, 0, 0, 1] indicates that the electroluminescence is normal.

In some embodiments of the present disclosure, the fully connected output layer 05 includes a first connection parameter set, and a second connection parameter set. The first connection parameter set is used to connect all the outputs of the GAP layer 04 to a first electroluminescence prediction result. In other words, a numerical operation is performed on all the outputs of the GAP layer 04 connected to the fully connected output layer 05 based on the first connection parameter set, to obtain the first electroluminescence prediction result, for example, the defective electroluminescence. The second connection parameter set is used to connect all the outputs of the GAP layer 04 to a second electroluminescence prediction result. In other words, a numerical operation is performed on all the outputs of the GAP layer 04 connected to the fully connected output layer 05 based on the second connection parameter set, to obtain the second electroluminescence prediction result, for example, the normal electroluminescence. In some embodiments, the numerical operation is a weighted operation. Both the first connection parameter set and the second connection parameter set include a plurality of weight coefficients. The number of the multiple weight coefficients in the first connection parameter set or the second connection parameter set is the same as the number of the outputs of the GAP layer.

It should be noted that, with reference to FIG. 4, FIG. 4 shows an example of the parameter composition of the fully connected output layer 05. Assuming that the number of input channels of the GAP layer 04 is three, i.e., the number of channels of each image in the convolutional layer is three, the GAP layer 04 has three output results, which are the average values for the respective channels. In this case, the first connection parameter set of the fully connected output layer 05 includes three weight parameters of $w_1$, $w_2$, and $w_3$, which indicate channel fusion coefficients for the respective channels. The second connection parameter set also includes three weight parameters of $w_4$, $w_5$, and $w_6$.

Figure 5:
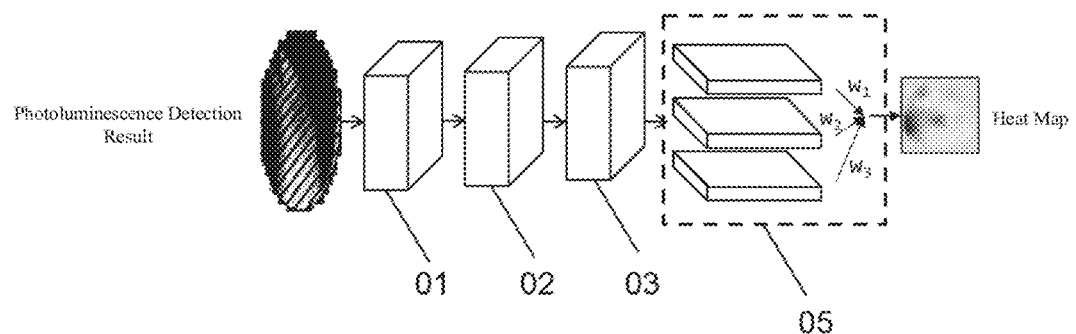
FIG. 5 is a schematic diagram illustrating a preset heat map model of a defect detection method according to an embodiment of the present disclosure.

In some embodiments of the present disclosure, the preset heat map model is obtained based on the trained initial neural network. FIG. 5 is a schematic diagram illustrating a preset heat map model of a defect detection method according to an embodiment of the present disclosure. As shown in FIG. 5, the preset heat map model includes, for example, three convolutional layers, i.e., a convolutional layer 01, a convolutional layer 02, a convolutional layer 03, and a fully connected output layer 05. Based on the photoluminescence detection result, when generating a micro-LED defect heat map, the preset heat map model ignores the second connection parameter set that connects the second electroluminescence prediction result, i.e., the normal electroluminescence, and only retains the above three weight parameters of $w_1$, $w_2$, and $w_3$ of the first connection parameter set that connects the first electroluminescence prediction result, i.e., the defective electroluminescence. Then, the three weight parameters are used as the channel fusion coefficients of the three output channels of the last convolutional layer 03, to synthesize a micro-LED electroluminescence defect heat map. Referring to FIG. 5, if the number of channels is three, the output that indicates the normal electroluminescence has three weight parameters, and the output that indicates the electroluminescence defect also has three weight parameters. However, when generating the micro-LED defect heat map, the three weight parameters of $w_4$, $w_5$, and $w_6$ that indicate the normal electroluminescence are ignored, and the three weight parameters of $w_1$, $w_2$, and $w_3$ that indicate the defective electroluminescence are used as the channel fusion coefficients for the respective channels.

In this embodiment, the photoluminescence detection result sample and the electroluminescence detection result sample of the wafer sample are acquired, and then the electroluminescence defect marking is performed on the photoluminescence detection result sample based on the electroluminescence detection result sample. Further, the initial neural network model is trained based on the marked photoluminescence detection result sample, to obtain the preset heat map model. In this embodiment, the electroluminescence defect marking is performed on the photoluminescence detection result sample based on the electroluminescence detection result sample, and then the initial neural network model is trained based on the marked photoluminescence detection result sample, to obtain the preset heat map model. In this embodiment, the relationship between the photoluminescence detection result and the electroluminescence detection result is determined using a model, so that the defect detection result of the wafer to be detected may be obtained by the preset heat map model and the photoluminescence detection result, thereby improving the detection efficiency of the wafer to be detected.

Figure 6:
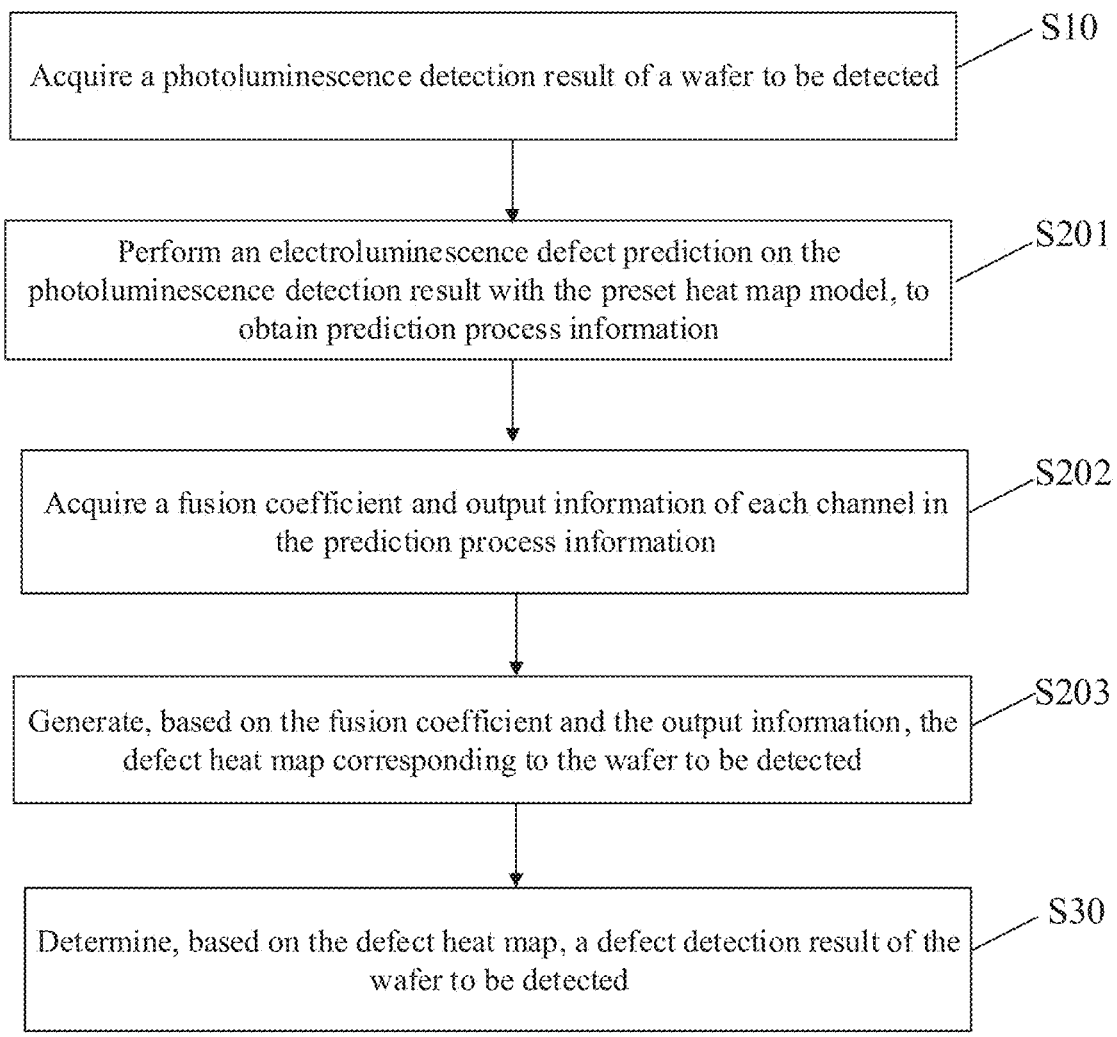
FIG. 6 is a flow diagram illustrating a defect detection method according to a third embodiment of the present disclosure.

Referring to FIG. 6, FIG. 6 is a flow diagram illustrating a defect detection method according to a third embodiment of the present disclosure.

Based on the above embodiments, in this embodiment, the step S20 may include steps S201 to S203.

In step S201, an electroluminescence defect prediction is performed on the photoluminescence detection result with the preset heat map model, to obtain prediction process information.

It should be noted that the electroluminescence defect prediction on the photoluminescence detection result through the preset heat map model may be performed by inputting the photoluminescence detection result into the preset heat map model, to obtain the prediction process information of the preset heat map model. The prediction process information may include the weight coefficients in the first connection parameter set used to calculate the electroluminescence defect in the fully connected output layer 05 of the preset heat map model, as well as the input and output information of each convolutional layer. The output of the preset heat map model may include the defective electroluminescence. Before the step of inputting the photoluminescence detection result into the preset heat map model, the method may include: processing, based on the preset segmentation size, the photoluminescence detection result sample, to obtain photoluminescence detection sub-images of the preset segmentation size; and inputting the photoluminescence detection sub-images of the preset segmentation size into the preset heat map model.

In step S202, a fusion coefficient and output information of each channel in the prediction process information are acquired.

It should be noted that the fusion coefficient of each channel may be a weight coefficient connecting the electroluminescence defect in the fully connected output layer. The output information may be output information of the last convolutional layer in the preset heat map model, which contains basic information of each channel.

In step S203, the defect heat map corresponding to the wafer to be detected is generated based on the fusion coefficient and the output information.

It should be noted that generating the defect heat map corresponding to the wafer to be detected based on the fusion coefficient and the output information may be to determine the defect heat map corresponding to the wafer to be detected according to the following formula:

$$\text{image} = \sum_{n=1}^{N} w_n \cdot X_n,$$

where image denotes the defect heat map, N denotes a number of output channels corresponding to a last convolutional layer of the preset heat map model, n denotes the $n^{th}$ channel, $w_n$ denotes a fusion coefficient of the $n^{th}$ channel which is obtained by training an initial neural network, and $X_n$ denotes the output information of the $n^{th}$ channel of the last convolutional layer of the preset heat map model.

In a specific implementation, assuming that the number of channels of the last convolutional layer, for example, the convolutional layer 03, is three, N is equal to three. $w_n$ denotes the fusion coefficient of the $n^{th}$ channel of the last convolutional layer, and $X_n$ denotes the output information of the n channel of the last convolutional layer. Then the result image output by the preset heat map model is an average value of the three channels. In this case, the first connection parameter set connecting the defective electroluminescence in the fully connected output layer 05 includes three weight parameters of $w_1$, $w_2$, and $w_3$, and the second connection parameter set connecting the normal electroluminescence also includes three weight parameters of $w_4$, $w_5$, and $w_6$. However, when generating the micro-LED defect heat map, the second connection parameter set of $w_4$, $w_5$, and $w_6$ connecting the normal electroluminescence are ignored, and only the three weight coefficients of $w_1$, $w_2$, and $w_1$ that indicate the defective electroluminescence are retained, and these three parameters are used as the fusion coefficients of the three output channels of the last convolutional layer.

In this embodiment, through the preset heat map model, the electroluminescence defect prediction is performed on the photoluminescence detection result to obtain the prediction process information, and then the fusion coefficient and the output information of each channel in the prediction process information are acquired. Further, the defect heat map corresponding to the wafer to be detected is generated based on the fusion coefficient and the output information. In this embodiment, through the preset heat map model, the electroluminescence defect prediction is performed on the photoluminescence detection result to obtain the prediction process information, and then the fusion coefficient and the output information of each channel in the prediction process information are acquired. Further, the defect heat map corresponding to the wafer to be detected is generated based on the fusion coefficient and the output information, and then the defect detection result of the wafer to be detected may be determined based on the defect heat map. The step of electroluminescence detection of the wafer to be detected is omitted, thereby improving the detection efficiency and accuracy of the wafer to be detected.

Figure 7:
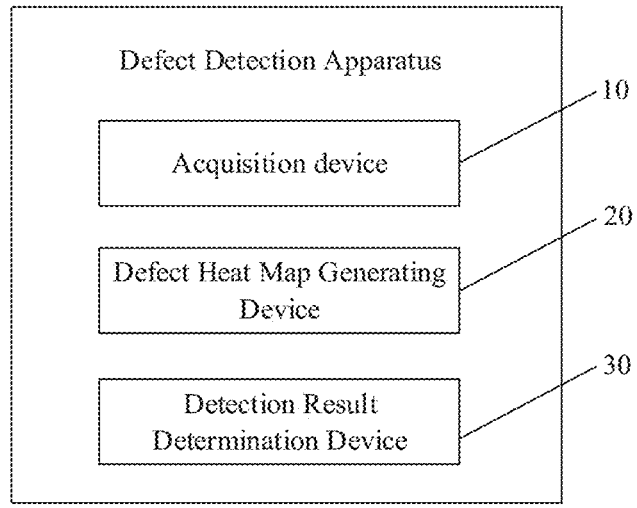
FIG. 7 is a block diagram illustrating a configuration of a defect detection apparatus according to an embodiment of the present disclosure.

Referring to FIG. 7, FIG. 7 is a block diagram illustrating a configuration of a defect detection apparatus according to a first embodiment of the present disclosure.

As shown in FIG. 7, the defect detection apparatus according to the embodiment of the present disclosure includes an acquisition device 10, a defect heat map generating device 20, and a detection result determination device 30.

The acquisition device 10 is configured to acquire a photoluminescence detection result of a wafer to be detected.

The defect heat map generating device 20 is configured to generate, based on the photoluminescence detection result and a preset heat map model, a defect heat map corresponding to the wafer to be detected. The preset heat map model is constructed based on a photoluminescence detection result sample marked by an electroluminescence defect.

The detection result determination device is configured to determine, based on the defect heat map, a defect detection result of the wafer to be detected.

In this embodiment, the photoluminescence detection result of the wafer to be detected is acquired, and then the defect heat map corresponding to the wafer to be detected is generated based on the photoluminescence detection result and the preset heat map model, and the preset heat map model is determined based on the photoluminescence detection result sample marked by an electroluminescence defect. Further, the defect detection result of the wafer to be detected is determined based on the defect heat map. In this embodiment, since the defect heat map corresponding to the wafer to be detected is generated based on the photoluminescence detection result and the preset heat map model, and the defect detection result of the wafer to be detected is determined based on the defect heat map, compared with the traditional method of determining the defect detection result of the wafer based on the photoluminescence detection result and the electroluminescence detection result of the wafer, the defect detection method of this embodiment can improve the detection efficiency and detection accuracy of the wafer.

It should be noted that the above-described workflow is merely schematic, and does not constitute a limitation on the scope of protection of the present disclosure, and in practical application, a person skilled in the art may select some or all of them according to the actual need to realize the purpose of the scheme of the present embodiment, which is not limited herein.

In addition, technical details not exhaustively described in this embodiment can be referred to the defect detection methods provided in any embodiment of the present disclosure, which will not be repeated herein.

Based on the first embodiment of the defect detection apparatus described above in the present disclosure, a second embodiment of the defect detection apparatus of the present disclosure is provided.

In this embodiment, the defect heat map generating device 20 is further configured to acquire a photoluminescence detection result sample and an electroluminescence detection result sample of a wafer sample; perform, based on the electroluminescence detection result sample, the electroluminescence defect marking on the photoluminescence detection result sample; and train, based on the marked photoluminescence detection result sample, an initial neural network model, to obtain the preset heat map model.

Further, the defect heat map generating device 20 is further configured to process, based on a preset segmentation size, the photoluminescence detection result sample, to obtain photoluminescence detection sub-images of the preset segmentation size. Correspondingly, the performing, based on the electroluminescence detection result sample, the electroluminescence defect marking on the photoluminescence detection result sample, includes: performing, based on the electroluminescence detection result sample, the electroluminescence defect marking on the photoluminescence detection sub-images.

Further, the defect heat map generating device 20 is further configured to perform an electroluminescence defect prediction on the photoluminescence detection result with the preset heat map model, to obtain prediction process information; acquire a fusion coefficient and output information of each channel in the prediction process information; and generate, based on the fusion coefficient and the output information, the defect heat map corresponding to the wafer to be detected.

Further, the defect heat map generating device 20 is further configured to determine, based on the fusion coefficient and the output information, the defect heat map corresponding to the wafer to be detected through the following formula:

$$\text{image} = \sum_{n=1}^{N} w_n \cdot X_n,$$

where image denotes the defect heat map, N denotes a number of output channels corresponding to a last convolutional layer of the preset heat map model, n denotes the $n^{th}$ channel, $w_n$ denotes a fusion coefficient of the $n^{th}$ channel which is obtained by training an initial neural network, and $X_n$ denotes the output information of the $n^{th}$ channel of the last convolutional layer of the preset heat map model.

Further, the detection result determination device 30 is further configured to acquire a resolution of the defect heat map; smooth, when the resolution is greater than a preset resolution, the defect heat map; and determine, based on the smoothed defect heat map, the defect detection result.

Further, the detection result determination device 30 is further configured to determine, based on a preset defect determination threshold, a defective part in the defect heat map when the resolution is less than or equal to the preset resolution; and determine, based on the defective part, the defect detection result.

Other embodiments or specific implementations of the defect detection apparatus of the present disclosure may be referred to the embodiments of each of the methods described above, and will not be repeated herein.

In addition, embodiments of the present disclosure provide a computer-readable storage medium storing a defect detection program. The defect detection program, when executed by a processor, causes the processor to implement steps of the defect detection method described above.

It should be noted that, as used herein, the term "include", "comprise" or any other variant thereof is intended to cover a non-exclusive inclusion, so that a process, method, product or system that includes a range of elements includes not only those elements, but also other elements that are not explicitly listed, or also include elements inherent to such a process, method, product or system. Without further limitation, the elements limited by the statement "include a . . . " do not preclude the existence of another identical elements in the process, method, product or system that includes the elements.

The above serial numbers of the embodiments of the present disclosure are for descriptive purposes only, and do not represent the merits of the embodiments.

Through the above description of the embodiments, those skilled in the art can clearly understand that the embodiments of the above methods may be implemented by means of software and necessary general hardware platforms, or may also be implemented by hardware, but in many cases, the former is better implementation. Based on this understanding, the technical solutions of the present disclosure may be embodied in the form of a software product in essence or in a part that contributes to traditional technology. The computer software product is stored in a storage medium (such as a read-only memory/random access memory, a magnetic disk, or an optical disk) and includes a number of instructions to cause a terminal device (which may be a mobile phone, computer, server, air conditioner, or network equipment, etc.) to perform the method described in each of embodiments of the present disclosure.

The above are only preferred embodiments of the present disclosure, and are not intended to limit the patent scope of the present disclosure. Any equivalent structure or equivalent process transformation made using the contents of the description and drawings of the disclosure may be directly or indirectly applied in other related technical fields. All are similarly included in the patent protection scope of this disclosure.

The invention claimed is:

1. A defect detection method, comprising:
    acquiring a photoluminescence detection result of a wafer to be detected;
    generating, based on the photoluminescence detection result and a preset heat map model, a defect heat map corresponding to the wafer to be detected, the preset heat map model being constructed based on a photoluminescence detection result sample marked by an electroluminescence defect; and
    determining, based on the defect heat map, a defect detection result of the wafer to be detected.

2. The defect detection method of claim 1, before the generating, based on the photoluminescence detection result and the preset heat map model, the defect heat map corresponding to the wafer to be detected, further comprising:

acquiring a photoluminescence detection result sample and an electroluminescence detection result sample of a wafer sample;

performing, based on the electroluminescence detection result sample, electroluminescence defect marking on the photoluminescence detection result sample; and training, based on the marked photoluminescence detection result sample, an initial neural network model, to obtain the preset heat map model.

3. The defect detection method of claim 2, before the performing, based on the electroluminescence detection result sample, the electroluminescence defect marking on the photoluminescence detection result sample, further comprising:

processing, based on a preset segmentation size, the photoluminescence detection result sample, to obtain photoluminescence detection sub-images of the preset segmentation size, wherein the performing, based on the electroluminescence detection result sample, the electroluminescence defect marking on the photoluminescence detection result sample, includes:

performing, based on the electroluminescence detection result sample, the electroluminescence defect marking on the photoluminescence detection sub-images.

4. The defect detection method of claim 2, wherein the initial neural network includes a plurality of convolutional layers, a global average pooling (GAP) layer and a fully connected output layer, and further, the initial neural network includes three convolutional layers.

5. The defect detection method of claim 4, wherein the preset heat map model includes the plurality of convolutional layers, and the fully connected output layer.

6. The defect detection method of claim 1, wherein the generating, based on the photoluminescence detection result and the preset heat map model, the defect heat map corresponding to the wafer to be detected, includes:

performing an electroluminescence defect prediction on the photoluminescence detection result with the preset heat map model, to obtain prediction process information;

acquiring a fusion coefficient and output information of each channel in the prediction process information; and generating, based on the fusion coefficient and the output information, the defect heat map corresponding to the wafer to be detected.

7. The defect detection method of claim 6, wherein the generating, based on the fusion coefficient and the output information, the defect heat map corresponding to the wafer to be detected, includes:

determining, based on the fusion coefficient and the output information, the defect heat map corresponding to the wafer to be detected through the following formula:

$$\text{image} = \sum_{n=1}^{N} w_n \cdot X_n,$$

where image denotes the defect heat map, N denotes a number of output channels corresponding to a last convolutional layer of the preset heat map model, n denotes the $n^{th}$ channel, $w_n$ denotes a fusion coefficient of the $n^{th}$ channel which is obtained by training an initial neural network, and $X_n$ denotes the output information of the $n^{th}$ channel of the last convolutional layer of the preset heat map model.

8. The defect detection method of claim 6, wherein the fusion coefficient of each channel includes a weight coefficient in a first connection parameter set that connects a defective electroluminescence in the fully connected output layer, and a weight coefficient in a second connection parameter set that connects a normal electroluminescence in the fully connected output layer.

9. The defect detection method of claim 1 wherein the determining, based on the defect heat map, the defect detection result of the wafer to be detected, includes:

acquiring a resolution of the defect heat map;

smoothing, when the resolution is greater than a preset resolution, the defect heat map; and determining, based on the smoothed defect heat map, the defect detection result.

10. The defect detection method of claim 9, after acquiring the resolution of the defect heat map, further comprising:

determining, based on a preset defect determination threshold, a defective part in the defect heat map when the resolution is less than or equal to the preset resolution; and determining, based on the defective part, the defect detection result.

11. The defect detection method of claim 9, wherein determining, based on the smoothed defect heat map, the defect detection result, includes:

calculating, based on the smoothed defect heat map, an area of a defect area using a method of integrating an area within an envelope.

12. The defect detection method of claim 1, wherein the defect heat map is a wafer image showing a LED with a high probability of containing an electroluminescent defect location in a specially highlighted form.

13. A defect detection apparatus comprising a processor and a memory storing a defect detection program executable by the processor, wherein the defect detection program, when executed by the processor, causes the processor to;

acquire a photoluminescence detection result of a wafer to be detected;

generate, based on the photoluminescence detection result and a preset heat map model, a defect heat map corresponding to the wafer to be detected, the preset heat map model being constructed based on a photoluminescence detection result sample marked by an electroluminescence defect; and determine, based on the defect heat map, a defect detection result of the wafer to be detected.

14. A non-transitory computer-readable storage medium storing a defect detection program, wherein the defect detection program, when executed by a processor, causes the processor to;

acquire a photoluminescence detection result of a wafer to be detected;

generate, based on the photoluminescence detection result and a preset heat map model, a defect heat map corresponding to the wafer to be detected, the preset heat map model being constructed based on a photoluminescence detection result sample marked by an electroluminescence defect; and determine, based on the defect heat map, a defect detection result of the wafer to be detected.

* * * * *